United States Patent [19]

Schmitt et al.

[11] Patent Number: 4,558,779
[45] Date of Patent: Dec. 17, 1985

[54] CONVEYOR APPARATUS, IN PARTICULAR FOR USE IN PACKAGING PLANTS

[75] Inventors: Reinhold Schmitt, Giessen-Wieseck; Manfred Herbert, Biebertal; Walter Baur, Gruendau, all of Fed. Rep. of Germany

[73] Assignee: Rovema Verpackungsmaschinen GmbH, Fernwald, Fed. Rep. of Germany

[21] Appl. No.: 541,219

[22] Filed: Oct. 12, 1983

[30] Foreign Application Priority Data

Oct. 13, 1982 [EP] European Pat. Off. ........ 82109442.2

[51] Int. Cl.$^4$ ............................................. B65G 15/14
[52] U.S. Cl. .................................... 198/627; 198/853; 198/468.7; 414/900
[58] Field of Search ............... 198/627, 654, 841, 850, 198/851, 853; 414/47, 900

[56] References Cited

U.S. PATENT DOCUMENTS

| 2,307,976 | 1/1943 | Walz et al. | 198/654 X |
| 2,954,113 | 9/1960 | Hibbard | 198/851 |
| 2,987,168 | 6/1961 | Franz | 198/845 |
| 3,288,271 | 11/1966 | Burford | 198/654 X |
| 3,785,476 | 1/1974 | Poerink | 198/853 |
| 4,301,915 | 11/1981 | Michalik et al. | 198/851 |
| 4,358,010 | 11/1982 | Besch | 198/851 X |
| 4,398,629 | 8/1983 | Williamson | 198/627 X |

FOREIGN PATENT DOCUMENTS

| 217712 | 7/1958 | Australia | 198/853 |
| 2543707 | 4/1976 | Fed. Rep. of Germany . | |
| 2518776 | 11/1976 | Fed. Rep. of Germany | 198/841 |
| 1359696 | 3/1964 | France | 198/850 |
| 7803859 | 11/1978 | Netherlands | 198/841 |

Primary Examiner—Robert J. Spar
Assistant Examiner—Jonathan D. Holmes
Attorney, Agent, or Firm—Flynn, Thiel, Boutell & Tanis

[57] ABSTRACT

A conveyor apparatus includes first and second elongate conveyor belts which are parallel and adjacent, which have support surfaces which are approximately flush, and which each have a plurality of compartment walls secured on and projecting outwardly from the support surface. Each compartment wall has a portion which extends laterally over the support surface of the other conveyor belt and each compartment wall is associated with a respective one of the compartment walls on the other conveyor belt. The conveyor belts are normally driven synchronously, but can be moved relative to each other in order to change the spacing between respective pairs of the compartment walls. Each conveyor belt preferably includes at least one elongate chain having a plurality of support elements supported thereon, each of the compartment walls being supported on a respective one of the support elements.

26 Claims, 14 Drawing Figures

CONVEYOR APPARATUS, IN PARTICULAR FOR USE IN PACKAGING PLANTS

FIELD OF THE INVENTION

The invention relates to a conveyor apparatus and, more particularly, to a conveyor apparatus for use in packaging systems, for example for conveying flexible bags in a cartoning machine, including at least two pulling elements arranged parallel to one another, preferably chains of steel which are guided over chain wheels, and including support elements which are secured on the chains and form flat supporting surfaces for the articles to be conveyed.

BACKGROUND OF THE INVENTION

Conveyor belts of this type are known, in which the support elements are platelike and are dimensioned so that they follow one another on straight sections of the conveyor belt path of movement without any distance from one another which would be worth mentioning. In the case of curvatures in the path, however, gaps appear between the plates. Such belts are therefore as a rule used for conveying articles only on straight path sections. Many conveyed goods, for example flexible filled packaging bags, cannot be conveyed in regions of the belt in which slots are formed between the support elements, since the danger of jamming and pinching exists.

In the case of conveying flexible packaging bags, it is often necessary to shape the bags so that they can be moved without any difficulty into a narrow outer packaging, for example a box. To achieve this, a conveyor belt has already been constructed (see German Pat. No. 25 43 707) in which compartments for bags are formed by two L-shaped parts which are respectively secured on two belt sections, namely a lower belt and an upper belt, and which are moved relative to one another so that they increasingly narrow down the receiving space for the bag. Such a construction requires a considerable construction expense.

Also known are conveyor belts with U-shaped compartments (also called cups) which are secured directly to chains. Such conveyor belts have the disadvantage that the large weight of the cups results in an uneven operation due to the action of forces produced by the mass thereof.

Further known are link belts of plastic, in which the support elements serve at the same time as chain links. The solidity and strength of such belts is relatively low, so that belts of long length are not possible with this construction. However, long belt lengths are often needed in packaging plants, for example where items from several filling machines such as tube-bag machines are to be brought to a cartoning station.

A basic purpose of the invention is to construct a conveyor belt of the above-mentioned type so that, on one hand, it can be built with great length and, on the other hand, substantially continuous bearing surface is maintained in concave or convex sections of the track. Through a further development of the invention, a conveyor belt capable of shaping packages such as flexible filled packaging bags is to be provided.

SUMMARY OF THE INVENTION

This purpose is attained according to the invention by providing a conveyor apparatus of the foregoing type in which each support element is connected directly to the chains at two joint axes which coincide with axes of the chain links, whereby each joint axis is at the same time a joint axis for an adjacent support element and adjacent support elements overlap one another. In the overlapping regions, the overlapped parts have convex cylindrical surfaces with axes which coincide with the joint axis common to the adjacent support elements, the overlapping parts are not spaced or are spaced only a little from the convex cylindrical surface, and the flat bearing surfaces steplessly merge with the convex cylindrical surfaces.

The use of metal chains, preferably steel chains, gives the conveyor belt a great tensile strength, so that belts of very great length can be built. The special construction of the support elements produces, in each portion of the conveyor path, a closed or continuous surface, even where the path is curved concavely or convexly. This permits any desired routing of the conveyor belt, while simultaneously ensuring that conveyed good, for example flexible bags, can be conveyed without the danger that they will be jammed into slots or damaged there. A flat bearing surface is, for purposes of this application, to be understood to include a bearing surface which, for a safe carrying of the conveyed goods has rough portions, for example in the form of nubs or crossbars.

Preferably, the distance between adjacent joint axes equals the distance between adjacent chain link axes. This, however, is not an absolute prerequisite. The distance between adjacent joint axes may also be a whole multiple of the distance between adjacent chain joint axes. A structurally simple arrangement utilizes extended joint bolts of the chain for supporting the support elements. The fixing of the support elements on the chains by means of chain locks makes the exchanging of defective support elements or defective chain links easier. A chain lock with a U-shaped spring can be used here.

Particularly economical is the use of duplex chains. Duplex chains can be obtained in commerce, and are thus economical chains which are suitable for the purposes of the invention. As a rule, one will use roller chains. Although the invention can also be realized with chains without rollers, roller chains have the advantage that the frictional resistance is low on certain types of guideways. A particularly favorable spatial arrangement results if the support elements are secured on the outer side of the endless chains. The arrangement of the chains below the bearing surfaces has the advantage that, laterally and above the bearing surfaces, no hindering structural elements are provided. This is particularly favorable for use of the conveyor in conjunction with a cartoning machine, in which the conveyed goods are moved laterally off of the conveyor belt by means of slide members.

The support elements advantageously have cutouts and projections which cooperate with cutouts and projections on adjacent support elements. In such an arrangement, large widths can be realized for small chain distances. Also, one obtains straight side edges of the conveyor belt, and thus avoids steps there.

The overlapping parts at the overlapping regions are preferably concave cylindrical surfaces. This, however, is not absolutely necessary; the overlapping parts may also have only narrow bars which cooperate with convex cylindrical surfaces of the overlapped parts for the purpose of sealing. Behind these sealing bars, an undercutting of the overlapping parts may exist.

The support elements are preferably one-piece plastic molded parts. Such molded parts can be manufactured inexpensively. Many support elements are needed for each conveyor belt, so that the mentioned method of manufacture is particularly suitable. A well suited plastic is for example polycarbonate. The invention also involves advantageous developments with respect to the guiding of the conveyor belt. Plastic guide bars have the advantage that a great wear resistance and quiet running of the conveyor belt is achieved. When the guide bars cooperate with chain rollers, one obtains particularly low friction. Link guides are arranged at concave regions of the conveyor belt path of movement or at vertical regions, whereby the guide walls of the link guides preferably also cooperate with the chain rollers, through which the friction losses are held within acceptable limits.

A further development ensures that the conveyor belt, when running off of one chain wheel, is immediately released from it. This avoids the disadvantage that, during running off, jamming is created, or that the bearing surface of the conveyor belt becomes uneven.

For the formation of surfaces for the exact receiving of conveyed goods, it is possible to provide compartment walls which project approximately normally for the support elements. Also, the compartment walls can diverge upwardly a small amount. The wording "approximately normal" is supposed to include such a slight divergence. The compartment walls may also have upper cutouts for the engagement of fork prongs on which conveyed goods can be placed, and which are then wiped off from the compartment wall. Also, it is possible for the compartment walls to have bar-shaped elevations which extend horizontally and in this manner result in a more linear contact with the conveyor goods.

The possibility to have the conveyor belt extend convexly and concavely is utilized for shaping conveyed goods, for example flexible bags. In the case of a convex region of the conveyor belt, adjacent compartment walls become so positioned that they converge downwardly; which is favorable for receiving the bags. In concave regions, the compartment walls are positioned so as to converge upwardly, which causes the packaging goods to be compacted laterally.

Constructing the conveyor belt as two synchronously drivable belt sections permits a central adjustment of all compartment widths by adjusting the phase shift between the two belt sections.

The conveyor belt is also well suited for an arrangement having a lower belt and an upper belt, between which packaging bags are calibrated with respect to their thickness. This is based on the existence of a continuous belt surface at each location on the belt. It is possible to arrange the two belts so that they slowly converge in a conveying direction.

Due to the great tensile strength of the belt, a long belt can also be moved with only one driven double chain wheel. The already mentioned compartment walls can be secured elastically flexibly on the support elements in order to permit shaking.

BRIEF DESCRIPTION OF THE DRAWINGS

One exemplary embodiment of the invention is illustrated in the drawings, in which.

DETAILED DESCRIPTION

An endless conveyor belt which is identified as a whole with the letter F is associated with at least one conventional packaging machine V and at least one conventional cartoning machine K. The packaging machine V packages good in sealed plastic tube-bags, only the discharge end 1 of the machine V being illustrated. The cartoning machine K is diagrammatically illustrated, and includes a stack 2 of cardboard blanks, a row of boxes 55 during different operating phases, and devices 3 to 7 for closing the boxes. Furthermore, movable slide members 8a to 8d are parts of the cartoning machine K. The invention relates to the conveyor belt F, which is described in greater detail hereinafter in connection with FIGS. 2 through 14.

Figure 1:
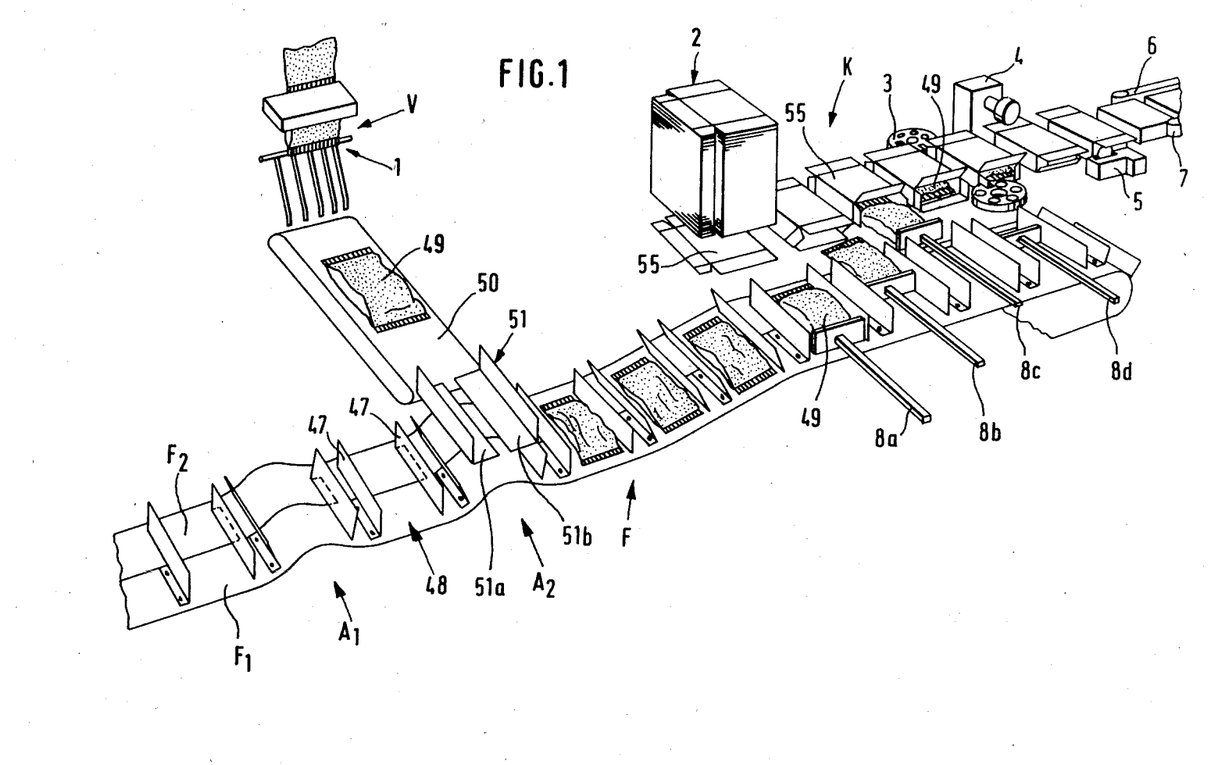
FIG. 1 is a perspective diagrammatic view of a conveyor belt embodying the invention in association with a conventional packaging machine and cartoning machine.

The conveyor belt F of FIG. 1 is composed of two similar belt sections $F_1$ and $F_2$. Only one of the belt sections is described hereinafter in detail, namely the belt section $F_1$.

Figures 7, 8, 9:
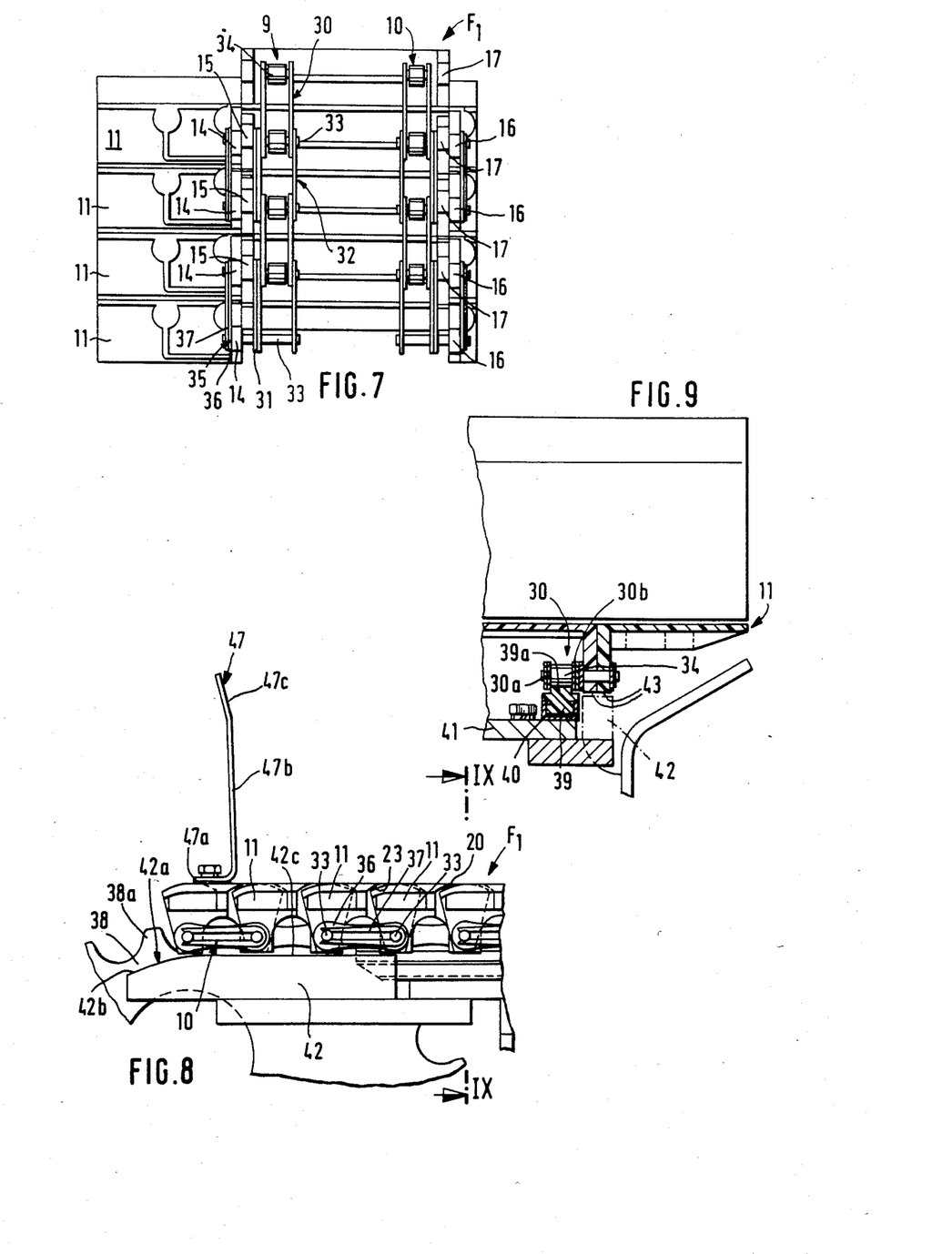
FIG. 7 is a fragmentary bottom view of a part of the conveyor belt of FIG. 1, wherein four of the support elements of FIG. 3 are illustrated.
FIG. 8 is a fragmentary side view of the conveyor belt of FIG. 1 in the region of a chain wheel.
FIG. 9 is a sectional view taken along the line IX—IX in FIG. 8.

As shown in FIG. 7, the belt section $F_1$ consists of two chains 9 and 10, and support elements 11 which are connected to the chains. One such support element 11 is illustrated in detail in FIGS. 3 to 5.

Figure 3:
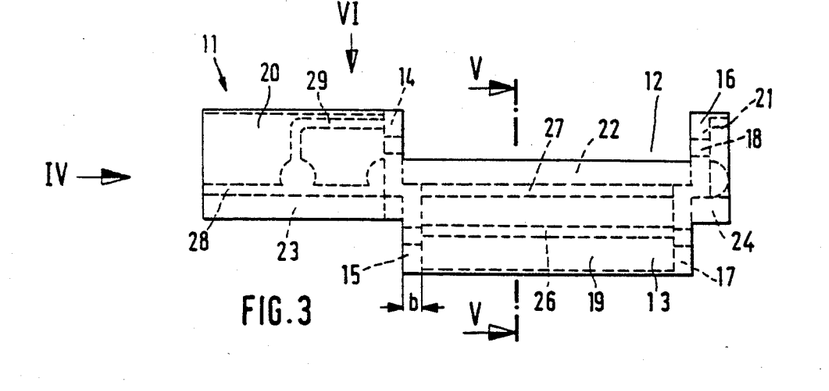
FIG. 3 is a top view of a support element which is a part of the conveyor belt of FIG. 1.
Figure 4:
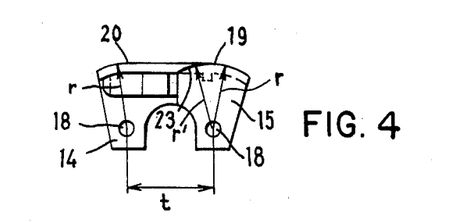
FIG. 4 is a side view of the support element of FIG. 3, taken in the direction of the arrow IV in FIG. 3.
Figure 5:
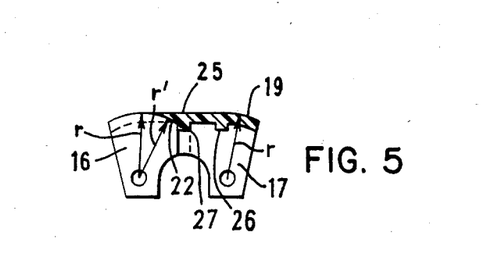
FIG. 5 is a sectional view of the support element of FIG. 3, taken along the line V—V in FIG. 3.
Figure 6:
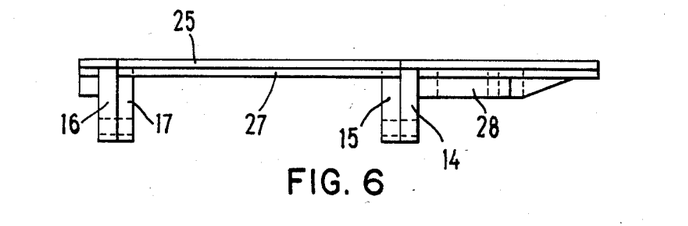
FIG. 6 is an elevational side view of the support element of FIG. 3, taken in the direction of the arrow VI in FIG. 3.

The support elements 11 are molded plastic parts, which are made for example of polycarbonate. The support element 11 has a rectangular cutout 12 in one side thereof and a rectangular projection 13 on the opposite side thereof. The projection 13 of this element 11 fits into the cutout 12 of an adjacent element 11. Four feet 14 to 17 are provided on the support element 11. The feet 15, 17 are provided on the projection 13, and the feet 14, 16 are provided adjacent opposite lateral edges of the cutout 12. Each foot has a bearing bore 18 therethrough. The feet 14 and 15 and the feet 16 and 17 are laterally offset with respect to one another, namely, their centers are offset by a distance which equals their width b. The distance t between the bearing bores 18 equals the link length of the chains 9 and 10 which is, for example, 1½″ (38.1 mm).

A convex cylindrical surface 19 is provided on the upper surface of the projection 13 of the support element 11, the curvature radius r of which is concentric with the centers of the bearing bores 18 of the feet 15, 17. Further convex cylindrical surfaces 20 and 21, which also have the radius r, are provided on the parts of the support element, which lie on opposite sides of the cutout 12. The cylindrical surfaces 20 and 21 are concentric with respect to the bearing holes 18 in the feet 14, 16.

Concave cylindrical surfaces 22, 23 and 24 are furthermore provided on the underside of the support element 11, which surfaces are also concentric with respect to the bearing bores 18. The concave cylindrical surface 23 is concentric with respect to the bearing bores 18 of the feet 15 and 17, while the concave cylindrical surfaces 23 and 24 are concentric with respect to the bearing bores 18 of the feet 14, 16. The radius r' of the concave cylindrical surfaces is slightly larger than the radius r of the convex cylindrical surfaces. A planar support surface 25 merges tangentially and thus steplessly into the convex cylindrical surfaces 19, 20 and 21.

On the underside of the support element, there are provided reinforcing ribs, namely, two cross ribs 26, 27 in the region of the projection 13 and ribs 28, 29 in the lateral region where the foot 14 is provided.

When the support elements are assembled, the convex cylindrical surface 19 extends under the concave cylindrical surface 22 of an adjacent element 11, while the convex cylindrical surfaces 20, 21 extend under the concave cylindrical surfaces 23, 24 of another adjacent support element 11. The radii r and $r_1$ are selected in such a manner with respect to one another that a clearance exists between the convex and concave cylindrical surfaces, which clearance is sufficiently great so that excessive friction is avoided or so that no contact exists at all.

The support elements 11 are connected to the chains 9 and 10. This is described hereinafter in connection with FIG. 7 and with respect to the chain 9. The chain 9 is a duplex chain, which is utilized as an elongate drive element and is utilized to couple the support elements 11. The chain 9 has inner links 30 and outer links 32. The chain links 30 and 32 are connected by pins or joint bolts 33. The joint bolts 33 are surrounded between the links 30 by rollers 34, and the chain 9 is thus a roller chain. The joint bolts 33 project laterally from the chain 9 and are received in the bearing bores 18 of the support elements 11. Each joint bolt 33 extends through two bearing bores 18 which are provided in the adjacent feet of two adjacent support elements 11. For example, the bolts 33 of the chain 9 extend through the bores 18 in the respective feet 14 and 15 of two adjacent support elements 11, while the joint bolts of the chain 10 each extend through the feet 16, 17 of two adjacent support elements 11. Between the outer links 32 and the adjacent feet 15 or 17 sheet-metal plates 31 are inserted. The combined thickness of the feet 14, 15 and the sheet-metal plate 31 approximately equals the width of one inner link 30. Chain locks 35 engage the outer feet 14 or 16. These chain locks 35 are conventional and each includes a plate 36 and a U-shaped spring 37, the side views of which can be seen from FIG. 8. The springs 37 engage annular grooves provided in the joint bolts 33.

The guiding of the belt $F_1$ is now discussed in connection with FIGS. 8 to 11.

A chain wheel 38 is partially illustrated in FIG. 8. The chain wheel 38 has a tooth system 38a on the peripheral surface thereof, the spacing between the teeth of which corresponds to the length of the chain links 30, 32, so that the rollers 34 engage the gaps between the teeth of the chain wheel 38. Directly after the point at which the chain runs off the chain wheel 38, there is provided a horizontally extending plastic guide bar 39 (FIG. 9) for the chain. The guide bar 39 has an upward projection 39a which extends therealong, fits between the lateral plates 30a, 30b of the inner link 30 and in this manner engages the rollers 34 to support the chain. The plastic bar 39 is, for reinforcement, provided in a U-shaped reinforcing frame 40. The reinforcing frame 40 is secured on a plate 41 of a support frame. The guide bars 39 are arranged beneath straight sections of the belt $F_1$.

FIGS. 8 and 9 also show a guide bar 42 which assures proper disengagement of the claims 9, 10 from the chain wheel 34. The guide bar 42 has a guide surface 42a, which cooperates with the lower end surfaces 43 of the feet of the support elements 11. The guide bar 42 has a lead-in ramp 42b in the region of the top of the chain wheel and a flat surface 42c which follows the ramp 42b and extends parallel to the guide bar 39. From viewing FIG. 8, it is clear that engagement of the chain links in the teeth of the chain wheel beyond the uppermost point of the path of movement of the chain wheel is prevented by the guide bar 42. Of course, a respective guide bar 39 is associated with each of the two chains 9 and 10. The chain wheel 38 is, of course, a double chain wheel with two spaced wheels having tooth systems, namely one wheel with a tooth system for the chain 9 and a further wheel with a tooth system for the chain 10.

The guideways according to FIGS. 8 and 9 are used for straight portions of the path of movement of the conveyor belt. Convex portions thereof can be guided by chain wheels, while for concave portions a connecting link guide according to FIG. 11 is provided.

Figure 11:
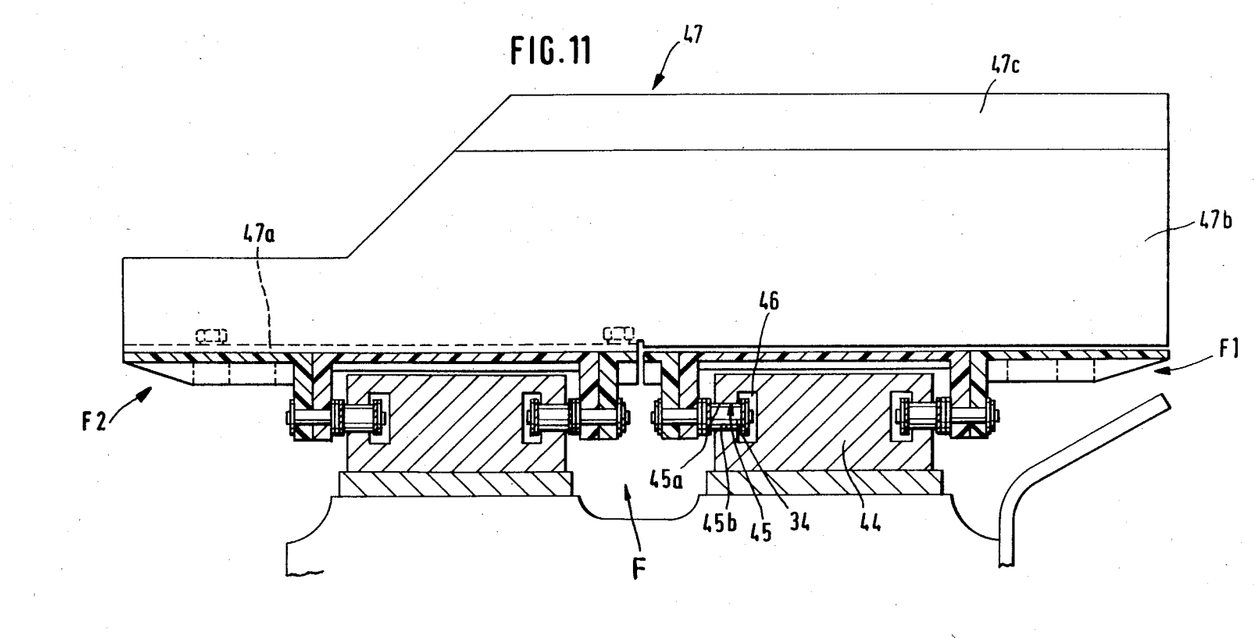
FIG. 11 is a sectional view of the conveyor belt taken along the line XI—XI in FIG. 2.

FIG. 11 illustrates the conveyor belt F, which is composed of the two belt sections $F_1$ and $F_2$. The connecting link guide is discussed in connection with the sectional belt $F_1$. For guiding the belt $F_1$, particularly along a concave path, a guide piece 44 is used which is curved to correspond with the desired conveyor path curvature. FIG. 11 is a sectional view of the guide piece. A respective guide slot 45 is provided in the guide piece for each chain. The guide slot 45 includes two spaced, parallel, horizontal guide surfaces 45a and 45b. The distance between the guide surfaces 45a and 45b is such that the rollers 34 of the associated chain are, with suitable play, received in and move along the slot 45, namely without jamming. The inner portion of the guide slot is a recess 46 in which the chain side bars move. The recess 46 is sufficiently large so that the walls thereof are not touched by the chain side bars or the ends of the joint bolts.

Compartment walls 47 are secured on each of the belt sections $F_1$ and $F_2$. The compartment walls 47 have the shape which is for example visible in FIGS. 8 and 11. Each compartment wall has a lower leg 47a fastened to a support element 11, a section 47b which is positioned approximately normal thereto and a lead-in section 47c which is slightly angled with respect to the section 47b. As one can recognize from FIG. 11, each fastening section 47a extends only over the width of one belt section (belt section $F_2$ in FIG. 11), while the compartment wall sections 47b and 47c are longer and also extend across the adjacent belt section (in FIG. 11 the belt section $F_1$).

One compartment wall of each compartment is secured on the belt $F_1$ and the other one on the belt $F_2$. For this, FIG. 1 is supposed to be viewed. A compartment is identified as a whole with reference numeral 48 in FIG. 1. The compartment wall 47 which is provided on the left of the compartment 48 is secured on the belt $F_1$ and the other compartment wall 47 of that compartment on the belt $F_2$. It is clear from FIG. 1 that, by moving the belts $F_1$ and $F_2$ relative to one another, the width of all of the compartments 48 can be changed simultaneously. After a desired compartment width has been established, the belts are normally driven synchronously until it is again necessary to change the compartment width.

Figure 10:
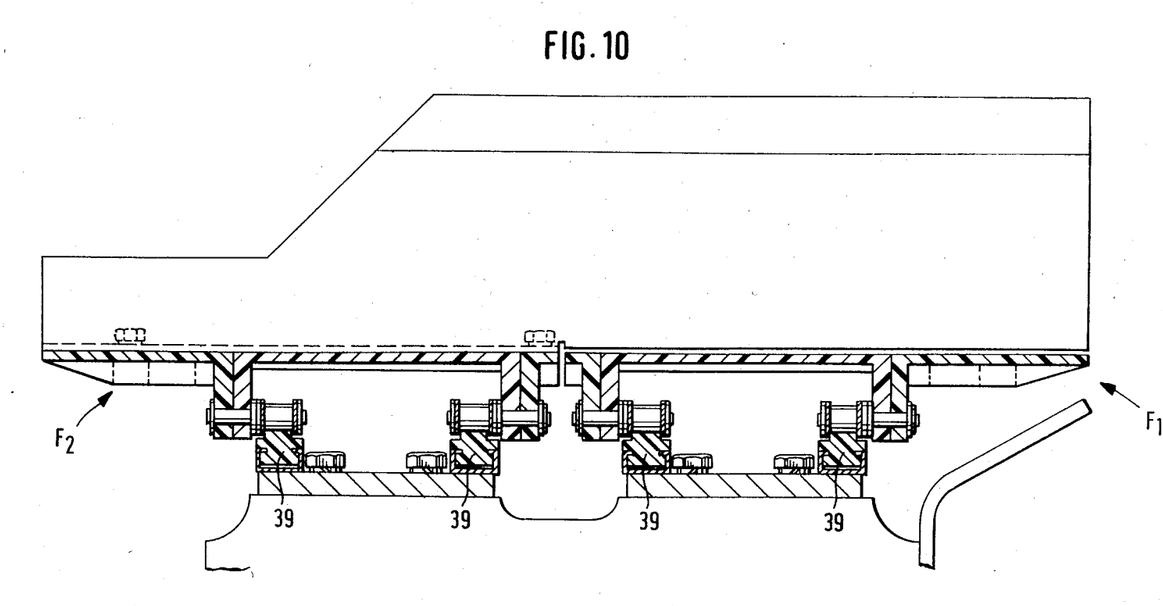
FIG. 10 is a sectional view of the conveyor belt taken along the line X—X in FIG. 2.

FIG. 10 illustrates a cross section of both sectional belts $F_1$ in the area of a straight portion of the conveyor path. One can see in FIG. 10, for all four chains, guideways of the type already discussed in connection with FIGS. 8 and 9.

Figure 12:
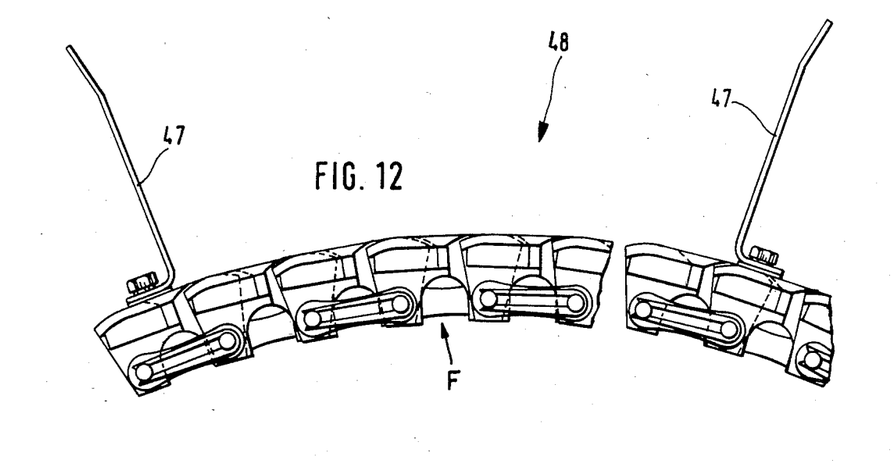
FIG. 12 is a fragmentary side view of the portion of the conveyor designated by the dash-dotted circle at XII in FIG. 2.

FIG. 12 shows that when the belt F passes through a convex curve, the compartments 48 enlarge upwardly in width. More specifically, the compartment walls 47 extend approximately radially with respect to the centerpoint of the curvature of the convex curve. For the convex curve, the belt F can travel over a chain wheel, which does not need to be driven.

Figure 13:
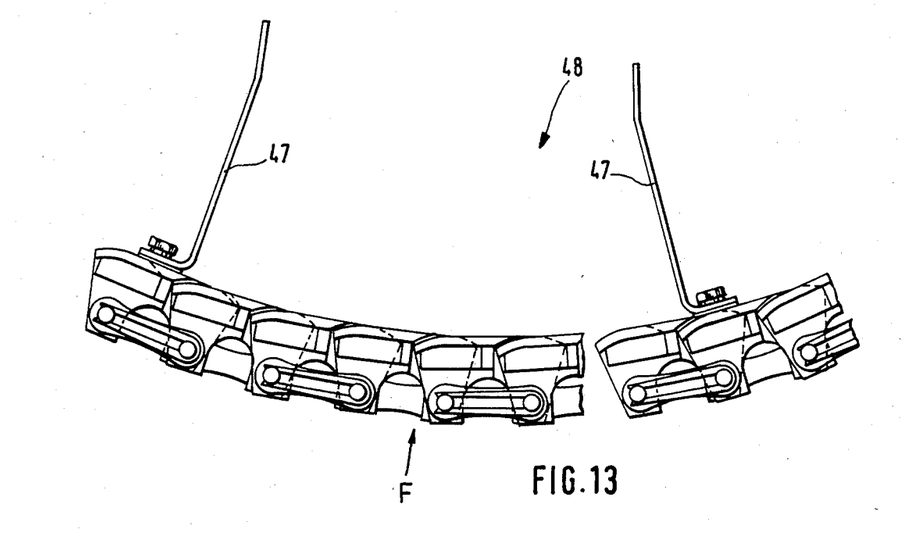
FIG. 13 is a fragmentary side view of the portion of the conveyor designated by the dash-dotted circle at XIII in FIG. 2.

FIG. 13 shows that the width of the compartments 48 narrows upwardly when the belt F passes through a concave curve. Here too, the walls 47 extend approximately radially with respect to the centerpoint of the curvature of the concave curve.

Figure 14:
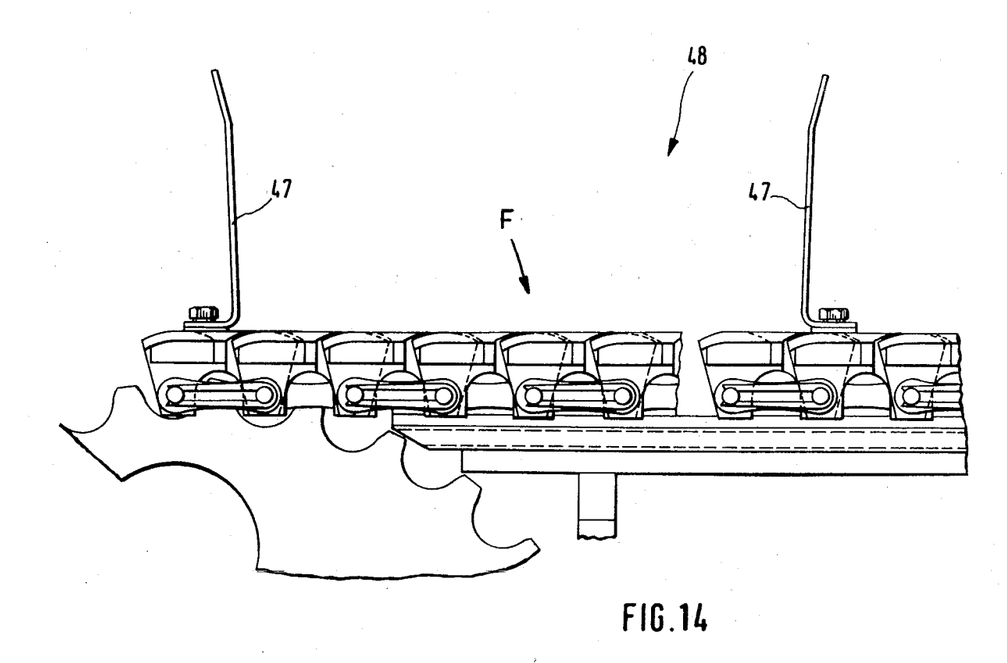
FIG. 14 is a fragmentary side view of the portion of the conveyor designated by the dash-dotted circle at XIV in FIG. 2.

FIG. 14 illustrates the conveyor F following a straight path and corresponds generally to the illustration according to FIG. 9. The compartments 48 have in this case approximately vertical walls. The walls 47 are inclined slightly so that the width of the compartment 48 diverges upwardly a small amount, but embodiments are also possible in which the walls 47 are exactly vertical.

Figure 2:
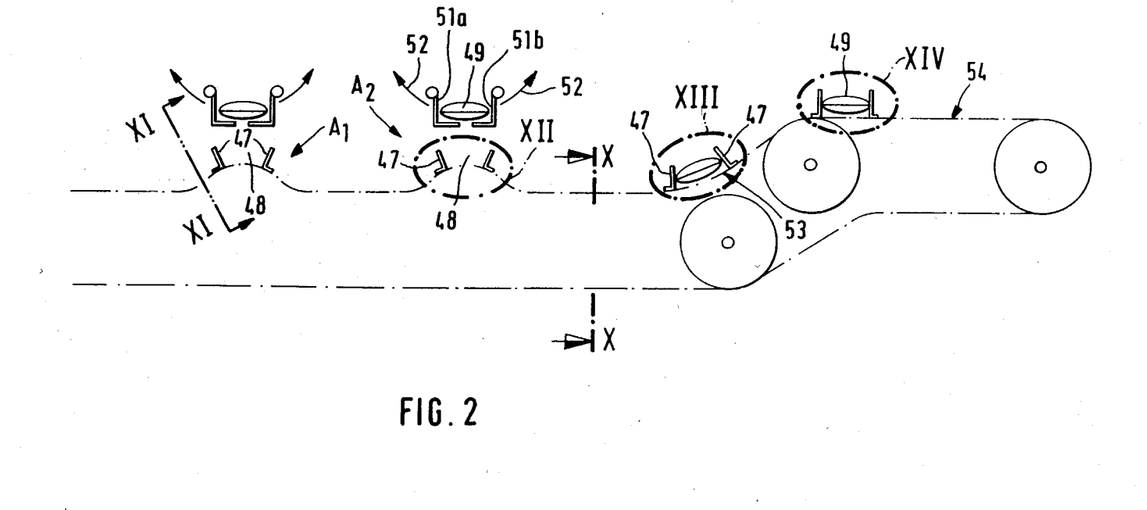
FIG. 2 is a diagrammatic side view of the conveyor belt according to FIG. 1.

The conveyor apparatus operates as follows. The conveyor belt F (FIG. 1) is curved convexly at the feeding points $A_1$ and $A_2$. As was already discussed, this effects a spreading apart of the compartment walls 47 (see FIG. 12). This spreading apart of the compartment walls 47 is also illustrated in FIGS. 1 and 2.

Flexible tube-bags 49 are supplied to the feeding points $A_1$ and $A_2$ by the packaging machine V. For this purpose, an intermediate conveyor belt 50 is provided for each packaging machine. At the end of the conveyor belt 50 there is provided a holding mechanism 51 with sheet-metal holding plates 51a and 51b. Each tube-bag 49 is first guided onto the sheet-metal holding plates 51a, 51b, which are then in a bag supporting position. At the point in time when the bag is supposed to drop into a compartment 48, the holding sheet-metal plates 51a, 51b are pivoted downwardly and outwardly in directions corresponding with the arrows 52, after which the bag 49, due to the force of gravity, falls downwardly into a compartment 48. A suitable, conventional control arrangement (not illustrated) is provided to ensure that the sheet-metal plates 51a, 51b are pivoted only when a compartment 48 is under the holding mechanism 51. The bag 49 can also, in the case of its deformation, be easily caught, since in the receiving stations $A_1$, $A_2$ the compartments 48 diverge upwardly.

In the concave conveyor portion 53 (FIG. 2) the compartment walls 47 approach one another (see also FIG. 13). Through this, the bag 49 is calibrated with respect to its width and position and, when the belt has thereafter moved it to the straight portion 54 of the conveyor, the bag 49 is moved into a box. For this, FIG. 1 is again to be viewed.

From the bottom of the stack 2 of box blanks, folded box blanks 55 are removed one after another and are erected. When a box 55 is completely erected, one of the slide members 8a–8d effects movement of a bag 49 into the box. The slide members 8a to 8d travel synchronously with the conveyor belt F. Various phases of such moving in are illustrated. When the bag 49 is completely moved in, the conventional closing devices 3, 4, 5, 6 and 7 successively effect a closing of the box.

Through the cooperation of the convex cylindrical surfaces 19, 20 and 21 and the concave cylindrical surfaces 22, 23 and 24, the formation of gaps in the belt F, particularly along the concave and convex curves, is avoided. Through this, the danger that the flexible bags 49 can become jammed is avoided. The presence of a continuous support surface in all portions of the conveyor can best be recognized from FIGS. 12 to 14. By arranging the chains 9, 10 and all guiding devices below the support elements 11, lateral guide means are avoided, so that the lateral movement of bags 49 in the cartoning machine K can occur without friction.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A conveyor apparatus, comprising first and second adjacent and substantially parallel conveyor belts, each said conveyor belt including two endless parallel chains which are guided over chain wheels and including plural support elements which are supported on said chains and which each have a flat support surface for supporting articles which are to be conveyed, each said support element being pivotally connected to the associated chains at two spaced, parallel pivot axes which each coincide with a respective chain link pivot joint, each said pivot axis for a given support element being coincident with one of said pivot axes of an adjacent said support element, and wherein adjacent said support elements overlap one another, the underlapping portions thereof each having a convex cylindrical surface which faces and is closely adjacent a surface on the overlapping portion of the adjacent support element and which has an axis coincident with the pivot axis common to the adjacent support elements, wherein said flat support surface on each said support element merges steplessly into said convex cylindrical surfaces thereon, said chains being arranged on a side of each said support element opposite said support surface thereon and being arranged inwardly of side edges of said support surface, wherein support elements on said first belt have side edges which are adjacent side edges of said support elements on said second conveyor belt, including a plurality of compartment walls supported at spaced locations on each said conveyor belt and each having a portion extending over the other conveyor belt, each said compartment wall secured on said first conveyor belt being associated with a respective said compartment wall secured on said second conveyor belt and defining a compartment therebetween, and wherein for simultaneously adjusting the width of each said compartment said first and second conveyor belts are supported for longitudinal movement relative to one another.

2. The conveyor apparatus according to claim 1, wherein the distance between said pivot axes of each said support element is substantially equal to the distance between adjacent said chain link pivot joints.

3. The conveyor apparatus according to claim 1, wherein said chain link pivot joints each include a joint bolt which projects laterally from the chain and which pivotally supports on the chain two of said support elements which are adjacent.

4. The conveyor apparatus according to claim 3, including chain locks cooperable with ends of said joint bolts remote from the chain for retaining the support elements on said joint bolts.

5. The conveyor apparatus according to claim 4, wherein each said chain lock includes a connecting plate through which two adjacent said joint bolts extend and a U-shaped spring which engages annular grooves provided at the ends of the joint bolts remote from the chain.

6. The conveyor apparatus according to claim 3, wherein the portions of two adjacent said support elements through which one of said joint bolts extends have a combined width which is approximately equal to the width of one inner link of the chain.

7. The conveyor apparatus according to claim 3, wherein said chains are roller chains which each have a plurality of rollers, each said roller being rotatably supported on a respective said joint bolt.

8. The conveyor apparatus according to claim 1, wherein said chains of each said conveyor belt are disposed between spaced portions of said support elements which are pivotally support on said claims.

9. The conveyor apparatus according to claim 1, wherein said support elements each have feet which project outwardly from a side thereof remote from said support surface thereon, each of said feet having a hole therein through which one of said joint bolts extends.

10. The conveyor apparatus according to claim 1, wherein each said support element has a cutout on one side thereof and a projection on the opposite side thereof, said projecting being received in the cutout of an adjacent said support element, and wherein each said support element has feet which project outwardly from a side thereof opposite said support surface thereon, each of said feet having a hole through which one of said joint bolts extends and being closely adjacent one of the feet of an adjacent said support element.

11. The conveyor apparatus according to claim 10, wherein said overlapping portions of said support elements have concave cylindrical surfaces, each said concave cylindrical surface facing, being closely adjacent, and being concentric with said convex cylindrical surface on an adjacent said support element.

12. The conveyor apparatus according to claim 1, wherein said support elements are molded plastic parts.

13. The conveyor apparatus according to claim 1, wherein each said conveyor belt includes elongate guide bars which movably support portions of said chains thereof, said guide bars each being made of plastic and being disposed in a metal frame.

14. The conveyor apparatus according to claim 13, wherein each said chain link pivot joint includes a joint bolt having a roller rotatably supported thereon, wherein each said guide bar has a width which is less than the width of a link of the associated chain, and wherein each said guide bar has a bearing surface which said rollers can roll along.

15. The conveyor apparatus according to claim 1, wherein each said chain link pivot joint includes a joint bolt having a roller rotatably supported thereon, and including link guide means for guiding said chains through concave conveyor portions, each said link guide means having two spaced guide surfaces which are parallel to one another and between which said rollers pass, the distance between said guide surfaces being slightly greater than the diameter of each said roller.

16. The conveyor apparatus according to claim 1, including means defining guide surfaces in regions where said chains leave said chain wheels, said guide surfaces slidably engaging surfaces provided on said support elements.

17. The conveyor apparatus according to claim 1, wherein each said compartment wall is approximately normal to the support surface on the support element on which the compartment wall is supported.

18. The conveyor apparatus according to claim 17, including means for guiding each said conveyor belt through a convex belt path at a feeding station at which conveyed goods are moved onto said conveyor belts, whereby each pair of said compartment walls which define one of said compartments therebetween are moved into an upwardly diverging relationship at said feeding stations.

19. The conveyor apparatus according to claim 17, including means at a location between a feeding station at which conveyed goods are moved onto said conveyor belts and a discharge station at which the conveyed goods are removed from said belts for guiding said conveyor belts through a concave belt path, whereby each pair of said compartment walls which define one of said compartments therebetween are moved into an upwardly converging relationship at said location.

20. The conveyor apparatus according to claim 17, wherein said compartment walls are each supported elastically on one of said support elements.

21. The conveyor apparatus according to claim 1, including an upper belt which is spaced above and has a surface facing said first and second conveyor belts, wherein said first and second conveyor belts carry conveyed goods which are flexible packaging bags filled with a fill material, and wherein said conveyed goods are engaged by said upper belt and said first and second conveyor belts as they pass therebetween and are thereby shaped to a predetermined thickness.

22. The conveyor apparatus according to claim 21, wherein only one of said chain wheels for each said chain is operatively rotationally driven.

23. A conveyor apparatus, comprising elongate, longitudinally movable first and second conveyor belts which are parallel and adjacent each other and which each have a support surface thereon, said support surfaces being substantially flush, each of said conveyor belts further having a plurality of compartment walls secured thereon at spaced locations therealong and projecting outwardly from said support surface thereon, each said compartment wall on each said conveyor belt having a portion which extends laterally over the support surface on the other of said conveyor belts, and each said compartment wall on said first conveyor belt being associated with a respective said compartment wall on said second conveyor belt and defining a compartment therebetween, and including drive means for selectively effecting relative longitudinal movement and synchronous longitudinal movement of said first and second conveyor belts, said relative movement of said conveyor belts effecting an adjustment of the distance between each said compartment wall on said first conveyor belt and the comparment wall on said second conveyor belt associated therewith.

24. The conveyor apparatus according to claim 23, including means for guiding each of said conveyor belts along a convex belt path, each pair of said compartment walls which define one of said compartments being moved into an upwardly diverging relationship while traveling through said convex belt path.

25. The conveyor apparatus according to claim 24, including means for guiding each of said conveyor belts along a concave belt path, each pair of said compartment walls which define one of said compartments being moved into an upwardly converging relationship while traveling through said concave belt portion.

26. The apparatus according to claim 24, wherein each said conveyor belt includes an elongate chain and a plurality of support elements supported on said chain, each of said compartment walls being fixedly secured to a respective one of said support elements.

* * * * *

UNITED STATES PATENT AND TRADEMARK OFFICE
CERTIFICATE OF CORRECTION

PATENT NO. : 4 558 779

DATED : December 17, 1985

INVENTOR(S) : Reinhold Schmitt et al

It is certified that error appears in the above-identified patent and that said Letters Patent is hereby corrected as shown below:

Column 9, Line 43; change "support" to ---supported---.

change "claims" to ---chains---.

Line 52; change "projecting" to ---projection---.

Signed and Sealed this

Twenty-fourth Day of June 1986

[SEAL]

Attest:

DONALD J. QUIGG

Attesting Officer

Commissioner of Patents and Trademarks